United States Patent
Sharma

(10) Patent No.: US 8,279,058 B2
(45) Date of Patent: Oct. 2, 2012

(54) SYSTEM, DEVICE AND METHOD FOR COMMUNICATING OVER POWER LINES

(75) Inventor: Manu Sharma, Untersiggenthal (CH)

(73) Assignee: Current Technologies International GmbH, Magenwil (CH)

( * ) Notice: Subject to any disclaimer, the term of this patent is extended or adjusted under 35 U.S.C. 154(b) by 869 days.

(21) Appl. No.: 12/266,344

(22) Filed: Nov. 6, 2008

(65) Prior Publication Data

US 2010/0109907 A1   May 6, 2010

(51) Int. Cl.
*G08B 1/08* (2006.01)
(52) U.S. Cl. ............ 340/538.11; 332/117; 307/1; 307/3
(58) Field of Classification Search ............ 340/531, 340/538.11, 12.32, 12.33, 12.37, 12.39, 12.4; 307/3
See application file for complete search history.

(56) References Cited

U.S. PATENT DOCUMENTS

| | | |
|---|---|---|
| 1,547,242 A | 7/1925 | Strieby |
| 2,577,731 A | 12/1951 | Berger |
| 3,656,112 A | 4/1972 | Paull |
| 3,942,168 A | 3/1976 | Whyte |
| 3,942,170 A | 3/1976 | Whyte |
| 3,944,723 A | 3/1976 | Fong |
| 3,967,264 A | 6/1976 | Whyte et al. |
| 4,012,733 A | 3/1977 | Whyte |
| 4,357,598 A | 11/1982 | Melvin, Jr. |
| 4,408,186 A | 10/1983 | Howell |
| 4,479,215 A | 10/1984 | Baker |
| 4,504,705 A | 3/1985 | Pilloud |
| 4,517,548 A | 5/1985 | Ise |
| 4,636,771 A | 1/1987 | Ochs |
| 4,668,934 A | 5/1987 | Shuey |
| 4,675,648 A | 6/1987 | Roth et al. |
| 5,272,462 A | 12/1993 | Teyssandier et al. |

(Continued)

FOREIGN PATENT DOCUMENTS

DE   100 08 602 A1   6/2001

(Continued)

OTHER PUBLICATIONS

"Archnet: Automatic Meter Reading System Power Line Carrier Communication", www.archnetco.com/english/product/produc_sl.htm, (2001).

(Continued)

*Primary Examiner* — George Bugg
*Assistant Examiner* — Edny Labbees

(57) ABSTRACT

A system, method and device for communicating over a power line are provided. In one embodiment, the system includes a first device configured to communicate via broadband communications having a bandwidth greater than one megahertz, and a second device having a first port and a second port. The second port may be configured to communicate with the first device via broadband communications and the first port configured to communicate over one or more power lines with one or more remote devices via one or more of a plurality of frequency bands, and wherein each of the plurality of frequency bands has a bandwidth that is less than five hundred kilohertz. The second device may select one of the plurality of frequency bands and one of a plurality of modulations schemes based on channel conditions and/or operational parameters. The second device may be configured to transmit and receive data in a multitude of the plurality of frequency band concurrently.

41 Claims, 9 Drawing Sheets

U.S. PATENT DOCUMENTS

| | | |
|---|---|---|
| 5,559,377 A | 9/1996 | Abraham |
| 5,625,863 A | 4/1997 | Abraham |
| 5,684,450 A | 11/1997 | Brown |
| 5,717,685 A | 2/1998 | Abraham |
| 5,777,544 A | 7/1998 | Vander Mey et al. |
| 5,777,769 A | 7/1998 | Coutinho |
| 5,856,776 A | 1/1999 | Armstrong et al. |
| 5,929,750 A | 7/1999 | Brown |
| 5,933,071 A | 8/1999 | Brown |
| 5,937,342 A | 8/1999 | Kline |
| 5,949,327 A | 9/1999 | Brown |
| 5,952,914 A | 9/1999 | Wynn |
| 5,994,998 A | 11/1999 | Fisher et al. |
| 5,995,572 A | 11/1999 | Dettmar |
| 6,014,386 A | 1/2000 | Abraham |
| 6,040,759 A * | 3/2000 | Sanderson ................... 725/130 |
| 6,144,292 A | 11/2000 | Brown |
| 6,157,292 A | 12/2000 | Piercy et al. |
| 6,172,597 B1 | 1/2001 | Brown |
| 6,275,144 B1 | 8/2001 | Rumbaugh |
| 6,282,405 B1 | 8/2001 | Brown |
| 6,300,881 B1 | 10/2001 | Yee et al. |
| 6,313,738 B1 | 11/2001 | Wynn |
| 6,331,814 B1 | 12/2001 | Albano |
| 6,396,392 B1 | 5/2002 | Abraham |
| 6,407,987 B1 | 6/2002 | Abraham |
| 6,452,482 B1 | 9/2002 | Cern |
| 6,480,510 B1 | 11/2002 | Binder |
| 6,522,650 B1 | 2/2003 | Yonge, III et al. |
| 6,624,532 B1 | 9/2003 | Davidow |
| 6,646,447 B2 | 11/2003 | Cern et al. |
| 6,668,058 B2 | 12/2003 | Grimes |
| 6,687,574 B2 | 2/2004 | Pietrowicz et al. |
| 6,844,809 B2 | 1/2005 | Manis et al. |
| 6,885,674 B2 | 4/2005 | Hunt et al. |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 | 11/2005 | Mollenkopf et al. |
| 6,965,303 B2 | 11/2005 | Mollenkopf |
| 6,980,090 B2 | 12/2005 | Mollenkopf |
| 6,980,091 B2 | 12/2005 | White et al. |
| 6,985,714 B2 | 1/2006 | Akiyama et al. |
| 6,993,317 B2 | 1/2006 | Belsak, Jr. |
| 6,998,962 B2 | 2/2006 | Cope et al. |
| 7,042,351 B2 | 5/2006 | Kline |
| 7,046,882 B2 | 5/2006 | Kline |
| 7,075,414 B2 | 7/2006 | Giannini et al. |
| 7,098,773 B2 | 8/2006 | Berkman |
| 7,103,240 B2 | 9/2006 | Kline |
| 7,142,094 B1 | 11/2006 | Davidow et al. |
| 7,173,935 B2 | 2/2007 | Lou et al. |
| 7,173,938 B1 | 2/2007 | Davidow |
| 7,194,528 B1 | 3/2007 | Davidow |
| 7,265,664 B2 | 9/2007 | Berkman |
| 7,307,512 B2 | 12/2007 | Yaney et al. |
| 7,321,291 B2 | 1/2008 | Gidge et al. |
| 7,382,232 B2 | 6/2008 | Gidge et al. |
| 7,415,541 B2 * | 8/2008 | Chan et al. ................... 709/250 |
| 7,609,631 B2 * | 10/2009 | Stanwood et al. ............ 370/230 |
| 7,795,877 B2 * | 9/2010 | Radtke et al. ................. 324/530 |
| 2001/0054953 A1 | 12/2001 | Kline |
| 2002/0002040 A1 | 1/2002 | Kline et al. |
| 2002/0027496 A1 | 3/2002 | Cern et al. |
| 2002/0041228 A1 | 4/2002 | Zhang |
| 2002/0060624 A1 | 5/2002 | Zhang |
| 2002/0080010 A1 | 6/2002 | Zhang |
| 2002/0095662 A1 | 7/2002 | Ashlock et al. |
| 2002/0097953 A1 | 7/2002 | Kline |
| 2002/0098867 A1 | 7/2002 | Meiksen et al. |
| 2002/0098868 A1 | 7/2002 | Meiksen et al. |
| 2002/0105413 A1 | 8/2002 | Cern et al. |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2003/0039257 A1 | 2/2003 | Manis |
| 2003/0054793 A1 | 3/2003 | Manis et al. |
| 2003/0062990 A1 | 4/2003 | Schaeffer, Jr. et al. |
| 2003/0153338 A1 | 8/2003 | Herz et al. |
| 2003/0160684 A1 | 8/2003 | Cern |
| 2003/0169155 A1 | 9/2003 | Mollenkopf et al. |
| 2003/0218549 A1 | 11/2003 | Logvinov et al. |
| 2003/0224784 A1 | 12/2003 | Hunt et al. |
| 2003/0227373 A1 | 12/2003 | Lou et al. |
| 2004/0001499 A1 | 1/2004 | Patella et al. |
| 2004/0056734 A1 | 3/2004 | Davidow |
| 2004/0083066 A1 | 4/2004 | Hayes et al. |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0136373 A1 | 7/2004 | Bareis |
| 2004/0174851 A1 | 9/2004 | Zalitzky et al. |
| 2004/0212500 A1 | 10/2004 | Stilp |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2004/0242185 A1 | 12/2004 | Lee |
| 2004/0264475 A1 | 12/2004 | Kowalski |
| 2004/0266332 A1 | 12/2004 | Lang |
| 2005/0046550 A1 | 3/2005 | Crenshaw et al. |
| 2005/0063422 A1 | 3/2005 | Lazar et al. |
| 2005/0111533 A1 | 5/2005 | Berkman |
| 2005/0128057 A1 | 6/2005 | Mansfield et al. |
| 2005/0129097 A1 | 6/2005 | Strumpf et al. |
| 2005/0164666 A1 | 7/2005 | Lang et al. |
| 2005/0168326 A1 | 8/2005 | White et al. |
| 2005/0200459 A1 | 9/2005 | White, II |
| 2005/0285720 A1 | 12/2005 | Cope et al. |
| 2006/0049693 A1 | 3/2006 | Abraham et al. |
| 2006/0082219 A1 | 4/2006 | Gerszberg et al. |
| 2006/0097573 A1 | 5/2006 | Gidge et al. |
| 2006/0146866 A1 | 7/2006 | Horvath et al. |
| 2006/0192672 A1 | 8/2006 | Gidge et al. |
| 2006/0220833 A1 | 10/2006 | Berkman |
| 2006/0233267 A1 * | 10/2006 | Brown et al. .................. 375/259 |
| 2006/0291575 A1 | 12/2006 | Berkman |
| 2007/0076505 A1 | 4/2007 | Radtke et al. |
| 2007/0081507 A1 * | 4/2007 | Koo et al. ..................... 370/338 |
| 2007/0127591 A1 * | 6/2007 | Chan et al. ..................... 375/296 |
| 2007/0201494 A1 | 8/2007 | Lou et al. |
| 2007/0214248 A1 | 9/2007 | Ikeda et al. |
| 2007/0223381 A1 | 9/2007 | Radtke |
| 2007/0236340 A1 | 10/2007 | White, II |
| 2007/0286079 A1 | 12/2007 | Mollenkopf et al. |
| 2007/0287405 A1 | 12/2007 | Radtke |
| 2008/0056338 A1 | 3/2008 | Yaney et al. |
| 2008/0063093 A1 | 3/2008 | Refaeli et al. |
| 2010/0026087 A1 * | 2/2010 | Morita et al. ..................... 307/3 |
| 2010/0111099 A1 | 5/2010 | Yonge et al. |

FOREIGN PATENT DOCUMENTS

| | | |
|---|---|---|
| DE | 100 12 235 C2 | 12/2001 |
| DE | 100 61 584 A1 | 6/2002 |
| DE | 101 19 039 A1 | 12/2002 |
| DE | 101 19 040 A1 | 12/2002 |
| DE | 101 46 982 C1 | 6/2003 |
| EP | 0 581 351 A1 | 2/1994 |
| EP | 0 470 185 B1 | 11/1995 |
| EP | 0 913 955 A2 | 5/1999 |
| EP | 1 011 235 A3 | 5/2002 |
| EP | 1 217 760 A1 | 6/2002 |
| EP | 1 021 866 B1 | 10/2002 |
| GB | 2 293 950 A | 4/1996 |
| GB | 2 315 937 A | 2/1998 |
| WO | WO-01/63787 A1 | 8/2001 |
| WO | WO-03/009083 A2 | 1/2003 |
| WO | WO-03/009083 A3 | 1/2003 |
| WO | WO-03/010896 A1 | 2/2003 |
| WO | WO-03/039022 A1 | 5/2003 |
| WO | WO-03/040732 A2 | 5/2003 |
| WO | WO-03/056715 A1 | 7/2003 |

OTHER PUBLICATIONS

Feduschak, N. A., "Waiting in the Wings: Is Powerline Technology Ready to Compete with Cable?", www.cabletoday.com/ic2/archives/0301/0301powerline.htm, (Mar. 2001),1-5.

Barstow, J M., "A Carrier Telephone System for Rural Service", *AIEE Transactions*, (1947),301-307.

Chang, SS L., "Power-Line Carrier", *Fundamentals Handbook of Electrical and Computer Engineering*, vol. II—Communication, Control, Devices and Systems, (1983),617-627.

Chen, Y-F et al., "Baseband Transceiver Design of a 128-Kbps Power-Line Modem for Household Applications", *IEEE Transactions on Power Delivery*, (2002),338-344.

Kim, W-O et al., "A Control Network Architecture Based on EIA-709.1 Protocol for Power Line Data Communications", *IEEE Transactions on Consumer Electronics*, (2002),650-655.

Jee, G et al., "Demonstration of the Technical Viability of PLC Systems on Medium- and Low-Voltage Lines in the United States", *IEEE Communication Magazine*, (May 2003),108-112.

Yoshitoshi, M et al., "Proposed Interface Specifications for Home Bus", *IEEE Transactions on Consumer Electronics*, (Aug. 1986),550-557.

Dostert, K "EMC Aspects of High Speed Powerline Communications", *Proceedings of the 15th International Wroclaw Symposium and Exhibition on Electromagnetic Capability*, (Jun. 27-30, 2000),98-102.

Piety, R A., "Intrabuilding Data Transmission Using Power-Line Wiring", *Hewlett-Packard Journal*, (May 1987),35-40.

"Outlook Conference 2004: Amperion Deployment Overview", *Primen Conference*, (May 7, 2004),1-10.

Dostert, K "Powerline Communications, Ch. 5", *Powerline Communications*, (2001),286, 288-292.

Horiguchi, Akira "High Speed Power Line Communication Technology", *Mitsubishi Electric Advance* vol. 109, (Mar. 2005),1-27.

"White Paper on Medium Voltage Powerline Communication (PLC) Networks", *CIGRE SC D2 WG 14, Broadband PLC*, (Mar. 2005),1-58.

"International Search Report", *International Search Report* Dated Mar. 2, 2010 PCT/US09/63241.

"Written Opinion", *Written Opinion* Dated Mar. 2, 2010 PCT/US09/63241.

* cited by examiner

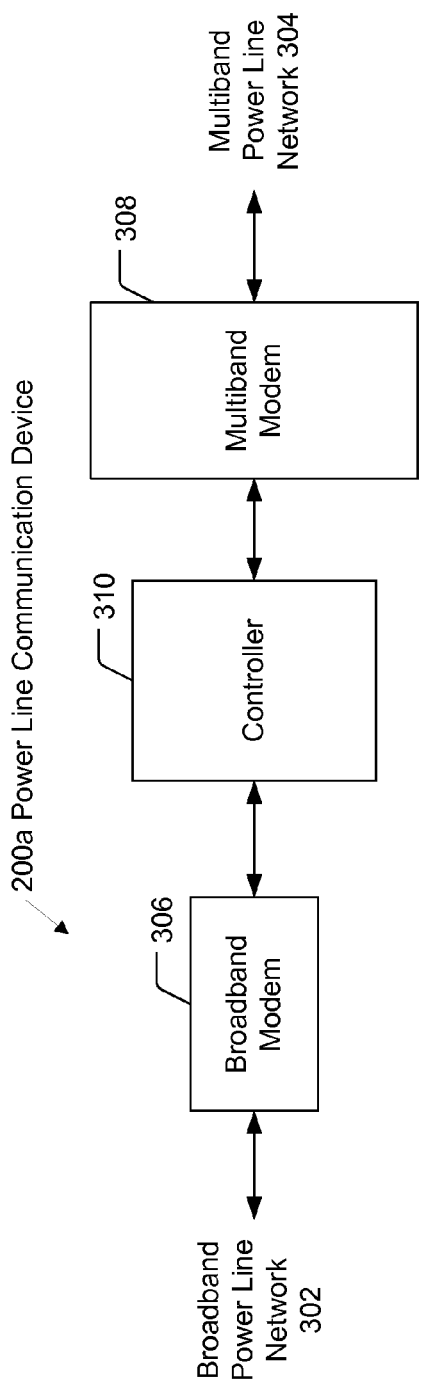
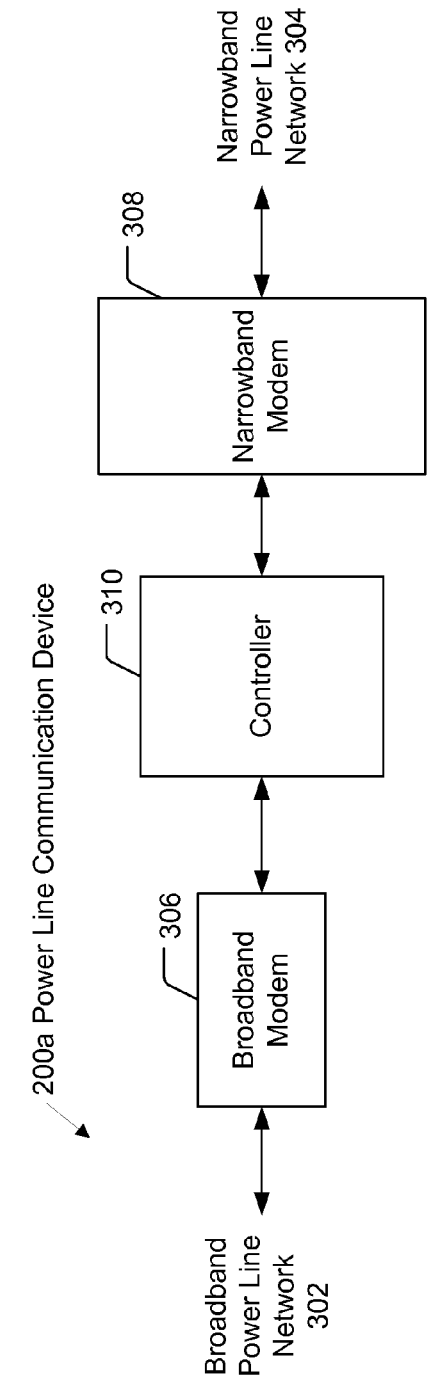
Figure 5a
Figure 5b

SYSTEM, DEVICE AND METHOD FOR COMMUNICATING OVER POWER LINES

FIELD OF THE INVENTION

The present invention generally relates to systems, devices and methods for communicating over power lines, and more particularly to systems, devices and methods for communicating over power lines using multiple communication channels.

BACKGROUND OF THE INVENTION

The power system infrastructure includes power lines, transformers and other devices for power generation, power transmission, and power delivery. A power source generates power, which is transmitted along high voltage (HV) power lines for long distances. In the U.S., typical voltages found on HV transmission lines range from 69 kilovolts (kV) to in excess of 800 kV. The power is stepped down to medium voltage (MV) power at regional substation transformers. MV power lines often carry power through neighborhoods and populated areas, and may comprise overhead power lines or underground power lines. Typical voltages found on MV power lines power range from about 1000 V to about 100 kV. The power is stepped down further to low voltage (LV) levels at distribution transformers. LV power lines typically carry power having voltages ranging from about 100 V to about 600 V to customer premises.

A power line communication system uses portions of the power grid (i.e., the power system infrastructure), such as the MV and LV power lines, to carry communications between various locations. For example, power utility companies may read power usage data from the utility meters located at consumer premises. Such data may be received from an automated meter by a power line communication device and transmitted over other power lines to a utility data center. Another example is broadband over power line internet access in which a power line communication system is adapted to deliver broadband internet access to subscribers. For example, a power line communication system may be coupled to the Internet at a point of presence (POP) and carry broadband communications between the POP and subscriber locations using power lines and other media such as fiber. At a subscriber location (residence or business), computing devices may be coupled to the power line communication system (PLCS) using a power line modem directly or indirectly. Such a power line communication may also provide video and VoIP services.

As the use of PLCS' expands, there is a need to deliver communications in an increasingly efficient and flexible manner. Further, as the amount of services delivered over the power lines grows, there is an increasing need to be able to reliably and effectively use the power lines for other communications, such as for "reading" automated meters, for controlling and maintaining the utility infrastructure, for maintaining the power line communication systems itself, and for various other uses. These and other needs may be addressed by one or more embodiments of the present invention.

SUMMARY OF THE INVENTION

The present invention provides a system, device and method for communicating over a power line. In one embodiment, the system includes a first device configured to communicate via broadband communications having a bandwidth greater than one megahertz, and a second device having a first port and a second port. The second port may be configured to communicate with the first device via broadband communications and the first port configured to communicate over one or more power lines with one or more remote devices via one or more of a plurality of frequency bands, and wherein each of the plurality of frequency bands has a bandwidth that is less than five hundred kilohertz. The second device may select one of the plurality of frequency bands and one of a plurality of modulations schemes based on channel conditions and/or operational parameters. The second device may be configured to transmit and receive data in a multitude of the plurality of frequency band concurrently.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 5 is a functional block diagram of power line communication device supporting broadband power line communications and multiband power line communications, in accordance with an example embodiment of the present invention;

DETAILED DESCRIPTION OF ILLUSTRATIVE EMBODIMENTS

Figure 1:
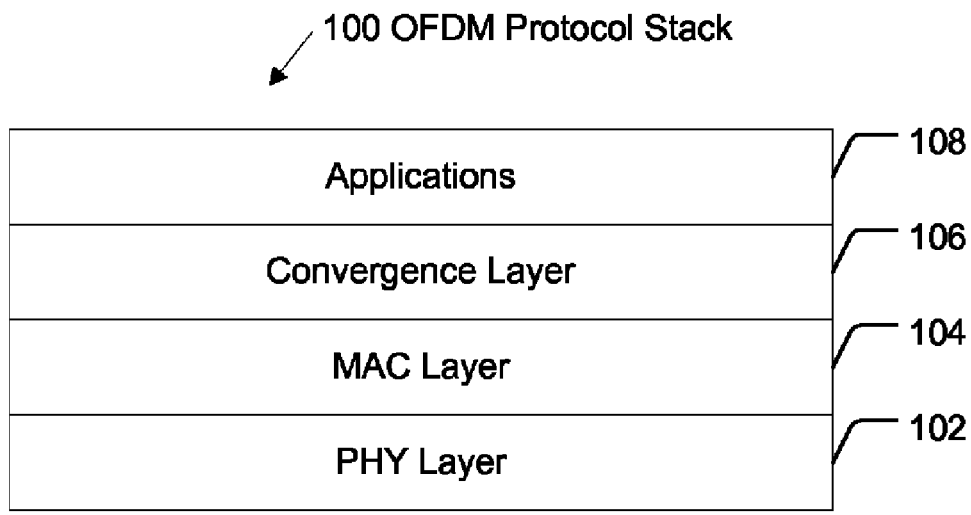
FIG. 1 is a diagram of a conventional OFDM protocol stack.

In the following description, for purposes of explanation and not limitation, specific details are set forth, such as particular networks, communication systems, computers, terminals, devices, components, techniques, data and network protocols, power line communication systems (PLCSs), software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, PLCSs, components, techniques, data and network protocols, software products and systems, operating systems, development interfaces, and hardware are omitted so as not to obscure the description of the present invention.

According to an embodiment of the present invention, a power line communication system implements multiband power line communications, that may operate in a larger (multiband) frequency band divided into multiple frequency bands (with each band being used to carry multiple carrier frequencies). In a specific embodiment, there may be multiple frequency bands within the range of 50 kHz and 500 kHz. Thus, the multiband system may be sometimes use narrow bands. Each band may be a fixed width band, such as, for example, multiple 50 kHz bands. In each band (e.g., each 50 kHz band), the communication devices of the system may employ a fixed number of equally spaced carrier frequencies or a different and/or variable number of carriers. The specific frequency range and the specific allocation of carrier frequencies and frequency bands may vary in differing embodiments. A frequency band selected for use from among the multiple bands is referred to herein as a band or channel. In some embodiments, the multiple bands may be contiguous (except for guard bands and/or notches) and in other embodiments, the various bands may be spaced apart and separated by bands used for other communication devices.

In some embodiments of the present invention, power line communications may be sent and received via low voltage power lines and/or medium voltage power lines using a power line communication device (PLCD). In various embodiments the power lines may be overhead power lines and/or underground power lines. A given PLCD may use one or more bands to communicate with other devices. Such sub-bands need not be adjacent frequency bands. For a given communication, a specific channel (i.e., a band) within the spectrum of the larger multiband frequency band may be used. Select bands may be enabled or disabled dynamically during normal operation, typically without adversely impacting performance. For example, a specific PLCD may determine that signal-to-noise ratios are low for first band and switch to another band for communications with select remote devices or all devices.

One advantage of the multiple band power line communication system is that high data rates may be achieved. For example, in a system for communicating with hundreds of residential power meters each band may provide an approximate data-rate of 128 Kbps over a 50 KHz band. Such a system maybe extended with present invention for multiple operational bands (e.g., from 50 KHz to 500 KHz i.e. nine bands) to provide a combined data-rate of greater than 1 Mbps.

FIG. 1 shows various layers in a conventional (prior art) OFDM communication protocol stack 100. The stack 100 includes a physical layer 102, which maybe partly or completely implemented in hardware. A given physical layer is typically designed to communicate via a single predetermined frequency band.

A media access control (MAC) layer 104 provides channel access control and includes an associate MAC address, making it possible to deliver data packets to a destination within the network. The channel access control mechanisms provided by the MAC layer 104 make it possible for several devices connected to the same physical medium (e.g., power line) to share the medium. In addition, time synchronization (if necessary) may be achieved with a network's central controller device via the MAC layer 104. The MAC layer 104 also acts as an interface between a convergence layer 106 (e.g., Internet Protocol layer) and the physical layer 102. The convergence layer 106 provides logical address mapping for the specific communication device so that software running at the application layer 108 may access data being received, and output the data being sent.

Figure 2:
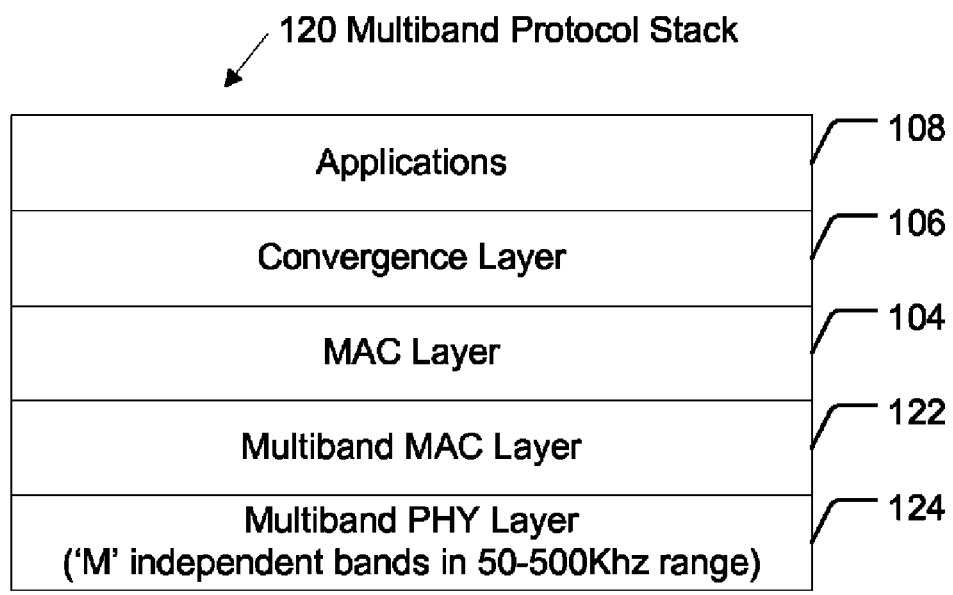
FIG. 2 is a diagram of a multiband protocol stack, in accordance with an example embodiment of the present invention.

FIG. 2 shows various layers in a multiband protocol stack 120, according to an example embodiment of the present invention, such an embodiment implemented by a modem suitable for communicating in a power line communication system that employs multiband communications. The multiband protocol stack 120 includes an application layer 108, convergence layer 106, and MAC layer 104, similar to those of the OFDM stack 100 discussed above. However, the multiband protocol stack 120 also includes a multiband MAC layer 122. Further, the multiband protocol stack 120 includes a multiband physical layer 124, rather than a single band physical layer 102. The multiband physical layer 124 enables communications using a plurality of different frequency bands within an overall operational frequency spectrum, (e.g., 50 kHz to 500 kHz).

As discussed, the term "band" (and channel) in the context of the multiband protocol stack 120 of one embodiment refers to a plurality of OFDM (frequency) carriers that collectively communicate data from a first device (the modulating device) to a second device (the demodulating device). Typically, the carriers of a band are contiguous (i.e., grouped together) although in some instances certain smaller groups of frequencies within a band may be notched out (filtered out) so as not to interfere with other devices known to user the notched frequencies.

A prior art single band system, such as one implementing OFDM protocol stack 100, typically uses only one set of OFDM carriers. However, a multiband system having M bands uses M sets of OFDM carriers—typically with each set of carriers being mutually exclusive of other OFDM carriers. For example, a two band system may use two sets of mutually exclusive OFDM carriers. In the multiband system each set of OFDM carriers (i.e., each band) may or may not comprise an equal number of carriers, and therefore, various bands may have different bandwidths (e.g., 40 KHz for one, 50 KHz for a second, and 60 KHz for a third). Thus, some bands may have greater communications capacities than other bands.

In one embodiment, at any given time a PLCD may operate at any band among the multiple bands. The multiband MAC layer 122 selects the physical channel (corresponding to a band) so that the MAC layer 104 operates seamlessly, similar to as if it were in a single band OFDM modem. Accordingly, the application layer 108, convergence layer 106 and MAC layer 104 may be implemented seamlessly. For outgoing communications, the upper MAC layer 104 passes a data packet to the multiband MAC layer 122, which categories the data packet for transmission by one of the physical layers 124.

Figure 3:
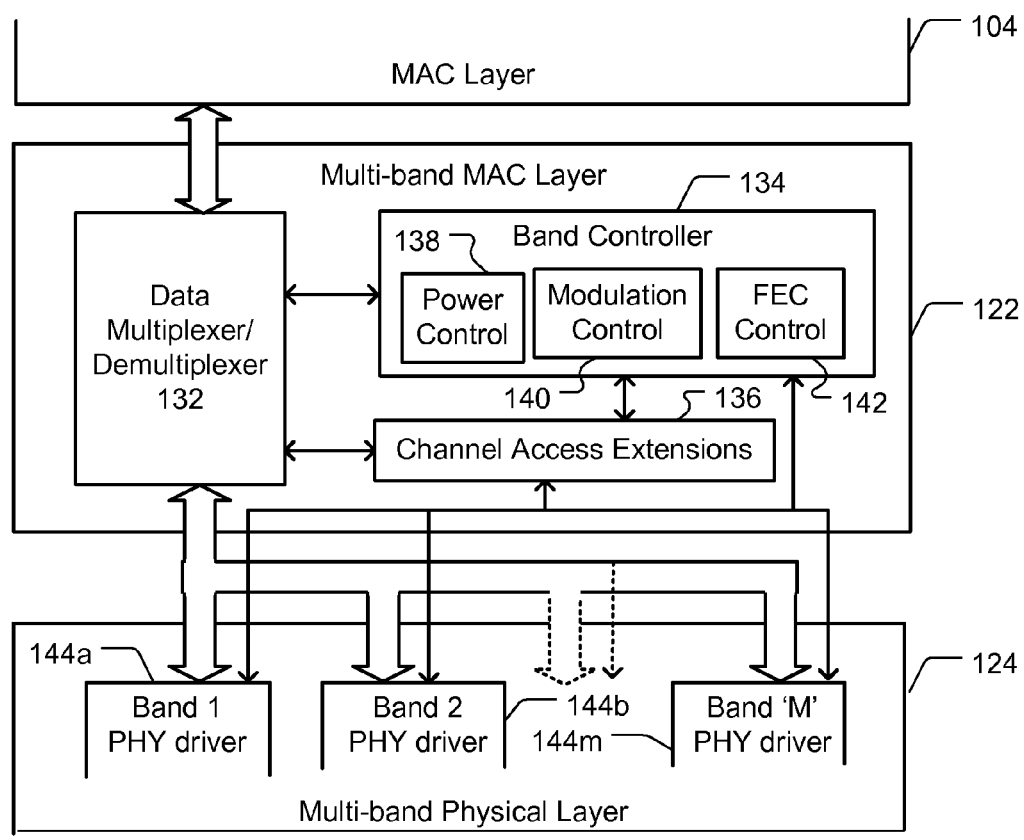
FIG. 3 is a block diagram of a multiband MAC layer and multiband physical layer of a multiband protocol stack in accordance with an example embodiment of the present invention.

FIG. 3 shows a detailed view of the multiband MAC layer 122 and multiband physical layer 124 according to one embodiment of the present invention. The multiband MAC layer 122 includes a data multiplexer/demultiplexer 132, a band controller 134, and channel access extensions module 136. When transmitting data, the MAC layer 104 passes data to the multiband MAC layer 122. The data multiplexer/demultiplexer 132 of the multiband MAC layer 122 categories each block of data for transmission by one of the physical band drivers 144. The band to be used for transmission (which determines the physical driver 144 to be provided the data for transmission) may be determined from the size of data block, the capacity of a given band based on channel conditions, a channel access policy for a given band, and/or other information. For data being received, the data multiplexer/demultiplexer 132 removes band specific information from the received data packet and passes the data as a MAC data packet to the MAC layer 104.

The band controller 134 may include a power control module 138, a modulation control module 140, and a forward error correction (FEC) module 142. The band controller 134 keeps track of physical channel conditions (e.g., stores data of channel noise and attenuation) on each operational band. For example, the channel noise and attenuation may be different at different frequencies (thus on different bands). The conditions may be monitored on each band through queries to corresponding physical layer driver. Channel noise may vary over time, thus making it important in some embodiments to regularly monitor noise. Thus, the physical drivers 144 may provide direct or indirect (where the actual values maybe derived from other available statistics) noise and attenuation values (and/or data other physical conditions) to the band controller 134. The band controller 134 may periodically (and/or continuously) store values of physical conditions in order to obtain a larger perspective over time for the conditions of each band.

The band controller 134 interfaces with each available physical layer driver 144a-m (corresponding to each band) and also may receive operational parameters such as, for example, Receive Signal Strength Indicator (RSSI), Signal-to-Noise Ratio (SNR), CRC (Cyclic Redundancy Check) failure count, and/or other parameters. Based on these conditions (e.g., channel noise and attenuation for each band) and operational parameters, the band controller 134 (e.g., one of its respective sub-blocks Power Control 138, Modulation Control 140 and/or FEC control 142) may also define one or more transmission and/or reception parameters for each band. The parameters that maybe defined, besides the band to be used for communication, may include, for example: transmission power, modulation scheme, forward error correction, pre-emphasis, post emphasis, and/or the (FEC) scheme. For example, if channel conditions deteriorate, the band controller 134 may dynamically determine to increase the transmission power, to a use a robust modulation scheme, to use a different band for communications, or to FEC code rate one half or some combination of all. For reception, an additional parameter that may be defined includes the amplification of input signals (e.g., Automatic Gain Control or (AGC)). In some embodiments, operational parameters and/or channel conditions also may be used (e.g., with other factors) to select the band, modulation scheme, error correction, and/or power transmission, etc., for initial communications with a remote device.

The channel conditions and operational parameters may be maintained separately for each remote PLCD with which a given PLCD communicates. For example, the power control module 138 may maintain and update a matrix of optimal transmission power and automatic gain control (for reception) settings for each peer (remote) power line communication device across each band. In other embodiments, additional and/or other settings may be stored.

For example, a first embodiment may use open loop power control to set the transmission power to be used when transmitting data to each remote PLCD in each band. Using the RSSI and SNR values of received data from each remote PLCD, the power control module 138 estimates the channel attenuation and noise to make an autonomous determination of the transmission power (e.g., which may result in an increase and/or decrease of the transmission power over time as the RSSI and SNR values change) to be used.

In another embodiment, a closed loop power control process may be used to set the transmission power to be used when transmitting data to each remote PLCD in each band. In this embodiment, the remote device transmits a reference signal with a fixed (known) transmission power (e.g., at the request of the PLCD setting the transmission power). The physical layer(s) 144 receiving the reference signal (which may be simultaneously received in a single band, select bands, or in all bands) will then provide feedback on the RSSI of the received signal (and/or other data) which may be used by the power control module 138 to adjust the transmission power to provide the desired quality of communications. The reference signals may be sent periodically (e.g., every second, minute, hour, etc.) from each PLCD in order to continue to adjust the transmission power to be used by each PLCD.

The modulation control module 140 maintains and updates a matrix of modulation schemes to be used for communication with each PLCD (or other per device) in each band. The FEC control module 142, depending on certain parameters (signal to noise ratio (SNR), retransmissions, cyclic redundancy check (CRC) failure count, and/or other data), defines error correction schemes to be used for communication with each device in each band.

The channel access extensions module 136 includes logic for band specific channel access mechanisms (e.g., logic for determining the band to use for a communication). More specifically, the channel access extensions module 136 receives operational input data from band controller module 134 and applies band specific channel access algorithms to ensure conformance to regulations pertinent to that channel. In one embodiment each frequency band may be controlled independently of the other bands, although the rules used for selecting a channel may be the same. For example, there may be channel access rules which use start of contention period, time of beacon transmission, and/or other information to select a band. Further, if one PLCD uses a first band at a given moment in time to send a communication, another device may use another band at the same time to send a communication (e.g., sent to different devices or the same device). In another embodiment each frequency band is not independently controlled. Instead, the entire operational frequency spectrum, comprising multiple bands may be used by only one device in the system at a given instant of time and that device may transmit using a single band, multiple bands, or all bands concurrently to one or more (or all) devices. This option allows for low cost implementation while compromising on performance.

The multiband physical layer 124 may include a transceiver circuitry coupled to a network medium for transmitting and receiving communications. In some embodiments, the physical layer 124 may enable multiple PHY drivers (including their transceivers) 144a-m to concurrently transmit and receive data in multiple bands (providing increased aggregate data-rates). In other embodiments only one PHY driver may be enabled at a given point of time, such may not result in enhanced data-rate, but instead provide an advantage of low cost and frequency agility. In some embodiments in which one of many available PHY drivers are used, the stack may allow for dynamic, real-time switching from one active PHY driver to other, thus enabling change of band in real-time, while others may allow only non-real-time switching between PHY drivers. Thus, in some embodiments each physical driver 144 may be designed to communicate (transmit and receive) using a predetermined frequency band (corresponding to one of the M bands).

The digital portions of the multiband physical layer 124 may be implemented in hardware and/or software. In some embodiments, a hardware implementation of the digital portions may comprise a dedicated ASIC while in other embodiments, it may be implemented via use of a Field Programmable Gate Array (FPGA). A software implementation typically may include implementation on a digital signal processor (DSP). Thus, the layer 124 may include (or be implemented with) a processor. The analog portions (e.g., the physical layers) of the multiband physical layer 124 may be implemented using an Analog-to-digital (A/D) converter and associated circuitry to comprise an analog front end (AFE)

Because different bands may have different bandwidths and different modulation schemes may be used in each band, the number of carriers in each band and thus the data transferred per band and per symbol and in each band may be different. The channel access extensions module 136 in the multi-band MAC layer 122 factors in such band specific issues and provides input to the data multiplexer/demultiplexer 132 which may segment, aggregate and or not perform any action on data; thus making it suitable for communication on any specific band.

Power Line Communication Device Embodiments

Figure 4:
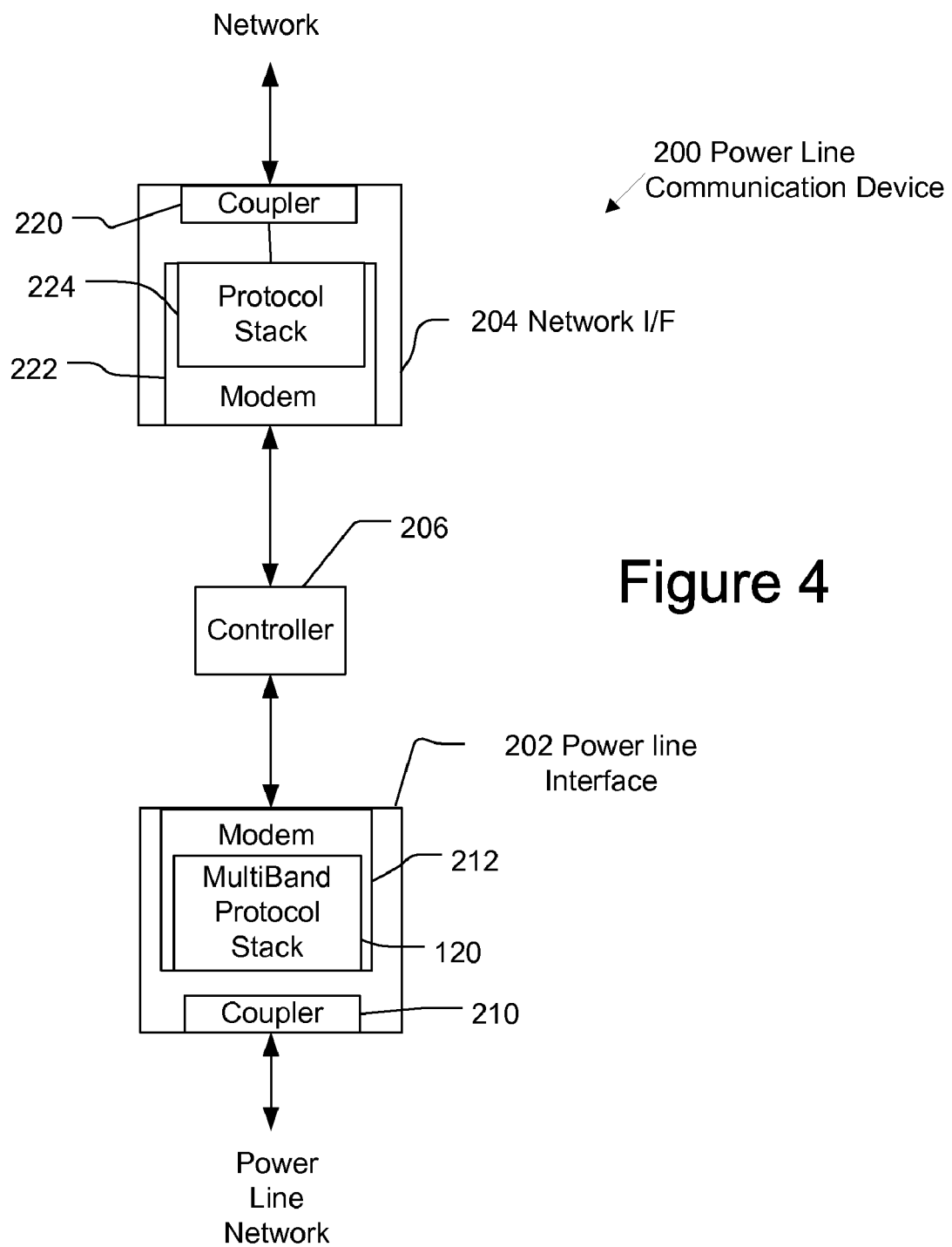
FIG. 4 is a block diagram of a communication device which couples to a power line network, in accordance with an example embodiment of the present invention.

FIG. 4 shows a power line communication device (PLCD) 200, according to an example embodiment of the present invention. The PLCD 200 includes a pair of interfaces, including a power line interface 202 and another network interface 204. The power line interface 202 couples to a power line, such as a medium voltage power line or a low voltage power line, allowing communications to be sent and received using power lines. The other network interface 204 may couple the PLCD 200 to another portion of the power line network or to a non-power line network, such as a wireless network. Different portions of the power line network may implement different protocols and/or different communication schemes, which may be bridged by this example embodiment. For example, in one embodiment, the power line interface 202 may couple to a portion of a power line network implementing the multiband PLC communication scheme, as shown in FIG. 5a, while in others a narrowband scheme may be used as described with respect to FIG. 5b in which case power line interface 202 may employ a conventional OFDM protocol stack 100. The other network interface 204 may couple to a portion of the power line network implementing a broadband PLC communication scheme (e.g., a wideband communications scheme or one operating in a frequency spectrum that is at least as broad as two, three, four or more multibands or narrow bands—e.g., operating in frequencies from 1 MHz to 80 MHz).

A controller 206 provides control and routing functions (e.g., bridging, routing, and/or switching) for the interfaces 202, 204. Thus, the controller 206 may have an address table stored in memory for determining the correct address to insert into a data packet for transmission (e.g., insert a MAC address based on the IP address of the data packet). Note that while the controller 206 is shown between the interfaces 202 and 204, in practice, in some embodiments the controller 206 may simply share a bus with the two interfaces while in others the controller may reside on either of interface 202 or 204 (and be integrated with such interface). Accordingly, a given communication may be received from a power line via the power line interface 202, and then directed to the network interface 204 where it may be packaged for transmission onto another portion of the power line network or onto a non-power line network, such as a wireless network. Similarly, a communication may be received from a network at the network interface 204, and then directed to the power line interface 202 where it may be packaged for transmission onto a power line network.

The power line interface 202 may include a coupler 210 which couples a modem 212 to one or more power line conductors so that signals may be transmitted and received via power lines. The power line interface 202 may also include an analog front end comprising appropriate filter circuitry, amplifier circuitry, surge suppressant circuitry, and other such circuitry (not shown). The power line interface 202 may also include the multiband protocol stack 120, which may be implemented in both hardware and software such as, for example, as described herein. However, the power line interface 202 also may be implemented via a plurality of conventional (e.g., OFDM) modems (e.g., modem chip sets), with each modem configured to communicate via separate band. Note that although the modem 212 is shown as a separate box in the figure, the modem 212 may formed, in part, by the multiband protocol stack 120.

The network interface 204 may be formed by another power line interface substantially the same as interface 202, by a broadband power line interface, or by an alternative network interface such as for communicating over a coaxial cable, twisted pair, fiber optic conductor, or wirelessly. The network interface 202 also may (optionally) include a coupler 220 which couples a modem 222 to a network medium (such as a power line). Alternately, the modem 222 may comprise a transceiver and include an antenna that allows the modem 222 to communicate wirelessly. The network interface also may have a protocol stack 224, such as the multiband protocol stack 120 or a broadband PLC protocol stack or other stack suitable for the communications desired. As discussed, the protocol stack 224 may be implemented as part of the modem 222.

The controller 206 controls the operation of the PLCD 200, and may include a processor and memory storing program code that controls the operation of the processor. In an example embodiment the controller 206 matches data with specific messages (e.g., control messages) and matches the addresses of data packets with destinations (i.e., perform routing, bridging, and/or switching), performs traffic control functions, performs usage tracking functions, authorizing functions, throughput control functions and other services. The processor may also be programmed to receive software and commands (received via either interface) and to process the commands and store the received software in memory for execution.

FIG. 5a depicts the functional components of an example power line communication device 200a which communicates via a broadband power line communication network 302 and a multiband power line communication network 304. The PLCD 200a includes components similar to those of PLCD 200 of FIG. 4, except that the network interface is illustrated as a broadband power line interface. Thus, a first network interface includes a broadband power line communication (BPL, such as one implemented in frequencies in the range of 1 MHz to 80 MHz) modem 306 that may use OFDM scheme, wavelet or any other equivalent communication scheme (and/or may include a conventional protocol stack 100). The second network interface includes a multiband powerline modem (e.g., for power line communications implemented in frequencies of the KHz range). Some embodiments of the PLC interface may be implemented using multiple modems, each having a conventional protocol stack 100 (with an analog front end that is configured to communicate via any one of a plurality of frequency bands), while other embodiments may be implemented using multiband protocol stack 124 and operates as described above. The controller 310 may include a memory storing program code and a processor perform routing functions, interworking functions, and buffering as described above. In an example implementation, the broadband modem 306 communications may traverse medium voltage power lines. For some communications, the controller 310 may cause the broadband modem 306 to re-transmit the data back onto the medium voltage power lines through the first interface (i.e., to repeat data). For other data, the data may directed to the multiband modem 306 which transmits the communication toward a remote device over a low voltage power line using one of the bands. For example, a communication (data packet) traversing a broadband power line communication network 302 may have a destination address for a device served by the PLCD 200a. When the PLCD 200a receives the communication and reads the destination address (e.g., IP address or any protocol address such as one that identifies the destination endpoint), the controller may re-address the data packet (if necessary) and direct the data onto a low voltage power line via the multiband modem 308 at a selected band. Such a device may be suitable for routing data around distribution transformers between the MV and LV power lines. The power line network interface having the multiband modem 308 in this example operates as described above with regard to FIG. 4, and in similar manner as described above for the multiband protocol stack described with regard to FIGS. 2-4.

For communications originating from a device on the multiband network 304 (e.g., a low voltage power line), the multiband modem 308 processes the received communication and may provide the data to the controller 310 (or, in some instances directly to the broadband modem 306). The controller 310 may then direct the data packet to the broadband modem 306 for communication onto the broadband PLC network 302.

The power line modem 308 may operate at one given time at a specific band of the multiple frequency bands. For example, referring to FIGS. 4 and 5a the modem 212/308 may operate in a fixed width of 50 kHz band, occurring anywhere within a supported spectrum of 50 kHz to 500 kHz. In another embodiment, the modem 308 may concurrently operate (e.g., transmit or receive) in all of the bands within the larger frequency range (e.g., 50 KHz to 500 KHz). The specific bands and specific carrier frequencies may vary depending on the embodiment and implementation thereof. Further, the channel access extensions module 136 in the multiband MAC layer 122 (see FIG. 3), adapts automatically to respect any regulatory channel access procedures that may apply for an operational frequency band. For example, when configured for operations in CENELEC Band C in Europe, the system may follow channel access requirement rules specified for this band.

The broadband modem may communicate via broadband frequencies from 1 MHz to 80 MHz. Thus, from a functional perspective, the PLCD 200a provides a seamless interworking bridge between narrowband and broadband network.

FIG. 5b illustrates an example embodiment which communicates via a broadband power line communication network 302 and a narrowband power line communication network 304 (which need not be a multiband power line network). The PLCD 200a includes the components similar to those of PLCD 200a of FIG. 5a, except that modem 308 comprises a narrowband modem 308 (and need not be a multiband modem). Thus, the first network interface includes a broadband power line communication (BPL, such as one implemented in 1 to 80 MHz range) modem 306 that includes a conventional protocol stack 100 and is configured to communicate via broadband communications. As discussed, as used herein broadband communications refers to communications that communicate data signals in a frequency band that is greater than one MHz in width, more preferably greater than greater than 5 MHz in width, still more preferably greater than 10 MHz in width, and even more preferably greater than 20 MHz in width. As discussed, in some embodiments the operational frequency may anywhere from about 1 MHz to about 80 MHz. The second network interface includes a narrowband powerline modem 308 (e.g., for power line communications implemented in frequencies of the KHz range). As used herein narrowband communications refers to communications that communicate data signals in a frequency band that is less than 500 KHz in width, more preferably less than 200 KHz in width, still more preferably less than 100 KHz in width, and still more preferably less than 55 KHz in width. In this embodiment, the narrowband power line modem 308 may include a PLC interface that uses a conventional protocol stack 100. The controller 310 may include a memory storing program code and a processor perform routing functions, interworking functions, and buffering as described above. In an example implementation, the broadband modem 306 communications may traverse medium voltage power lines. For some communications, the controller 310 may cause the broadband modem 306 to re-transmit the data back onto the medium voltage power lines through the first interface (i.e., to repeat data). For other data, the data may directed to the narrowband modem 308 which transmits the communication toward a remote device over a low voltage power line using a narrowband communication. For example, a communication (a data packet) traversing a broadband power line communication network 302 may have a destination address for a device served by the PLCD 200a. When the PLCD 200a receives the communication and reads the destination address (IP or other protocol address), the controller may re-address the data packet (if necessary) and direct the data onto a low voltage power line via the narrowband modem 308. Such a device may be suitable for routing data around distribution transformers between the MV and LV power lines.

For communications originating from a device on the narrowband network 304 (e.g., a low voltage power line), the narrowband modem 308 processes the received communication and provides the data to the controller 310. The controller 310 may then direct the data packet to the broadband modem 306 for communication onto the broadband PLC network 302.

As discussed, the narrowband power line modem 308 of FIG. 5b may communicate using a single narrow frequency band. In other embodiments, the narrowband power line modem 308 may use multiple (different) narrow frequency bands for concurrent (or non-concurrent) communications. Such an embodiment may use a one or more modem chip sets (and/or one or more associated analog front ends) that includes a conventional protocol stack 100. For example, in a first embodiment the modem 308 may operate in a fixed width of 50 kHz band, occurring anywhere within a supported spectrum of 50 kHz to 500 kHz. The specific band and specific carrier frequencies may vary. In a second embodiment, the narrowband modem 308 may operate in two different bands having fixed widths of 50 kHz, occurring anywhere within a supported spectrum of 50 kHz to 500 kHz.

As discussed, the broadband modem may communicate via broadband frequencies from 1 MHz to 80 MHz. Thus, from a functional perspective, the PLCD 200*a* provides a seamless interworking bridge between narrowband and broadband network.

In this and the other embodiments described herein, when the device is communicating over a low voltage power line, the data signals may be differentially transmitted (and received) over the first and second energized power line conductors of the low voltage power line (via appropriate filtering and amplification circuitry).

Figure 6:
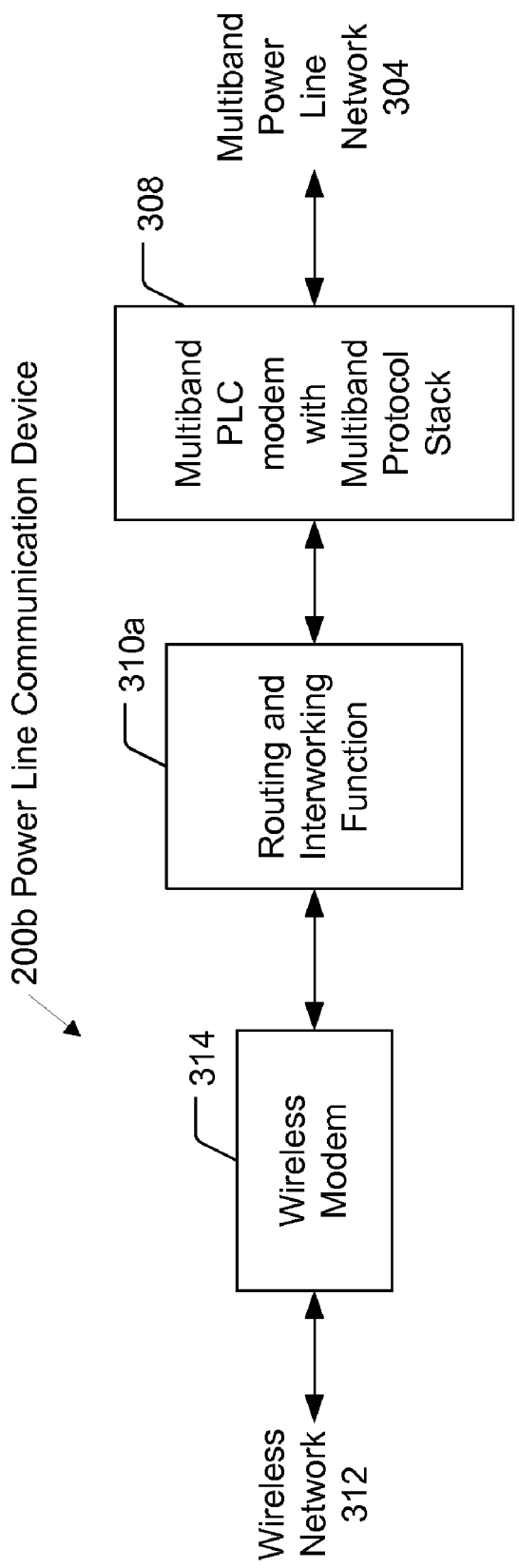
FIG. 6 is a functional block diagram of power line communication device supporting multiband power line communications and wireless network communications in accordance with an example embodiment of the present invention.

FIG. 6 shows functional portions of another power line communication device 200*b* which communicate over a wireless network 312 and a multiband power line communication network 304. The PLCD 200*b* includes components substantially similar to those of PLCD 200 of FIG. 4. A first network interface may include a wireless modem 314 (e.g., a wireless transceiver substantially compliant or compatible with one or more of IEEE 802.11a/b/g/n, IEEE 802.15, a General Packet Radio Service (GPRS), CDMA2000 or any other prevalent standard). A second network interface includes the multiband modem 308 that includes a multiband protocol stack 120. A controller may include the routing and interworking function module 310*a*. In an example implementation, wireless network communications may be received at the first interface and be processed by the wireless modem 314. The controller 310 may providing routing functions and interworking functions, and may provide the data to the multiband modem 308 which transmits the data over the multiband power line communication system network 304, such as via a medium voltage or low voltage power line. The data may addressed in a data packet (e.g., by the controller 310) with an address corresponding to the target destination device. The power line network interface having the multiband modem 308 operates as described above with regard to FIG. 4, and in similar manner as described above for the multiband protocol stack described with regard to FIGS. 2-4.

For communications originating from a device connected to the power line network 304, the multiband modem 308 receives and processes communication and provides the data to the controller 310. The controller 310 may, if necessary, re-address the data packet and provide the data to the wireless modem 314 for wireless transmission by the wireless modem 314. Instead of a multiband modem 308, other embodiments may include a narrowband modem 308 as described above.

Figure 7:
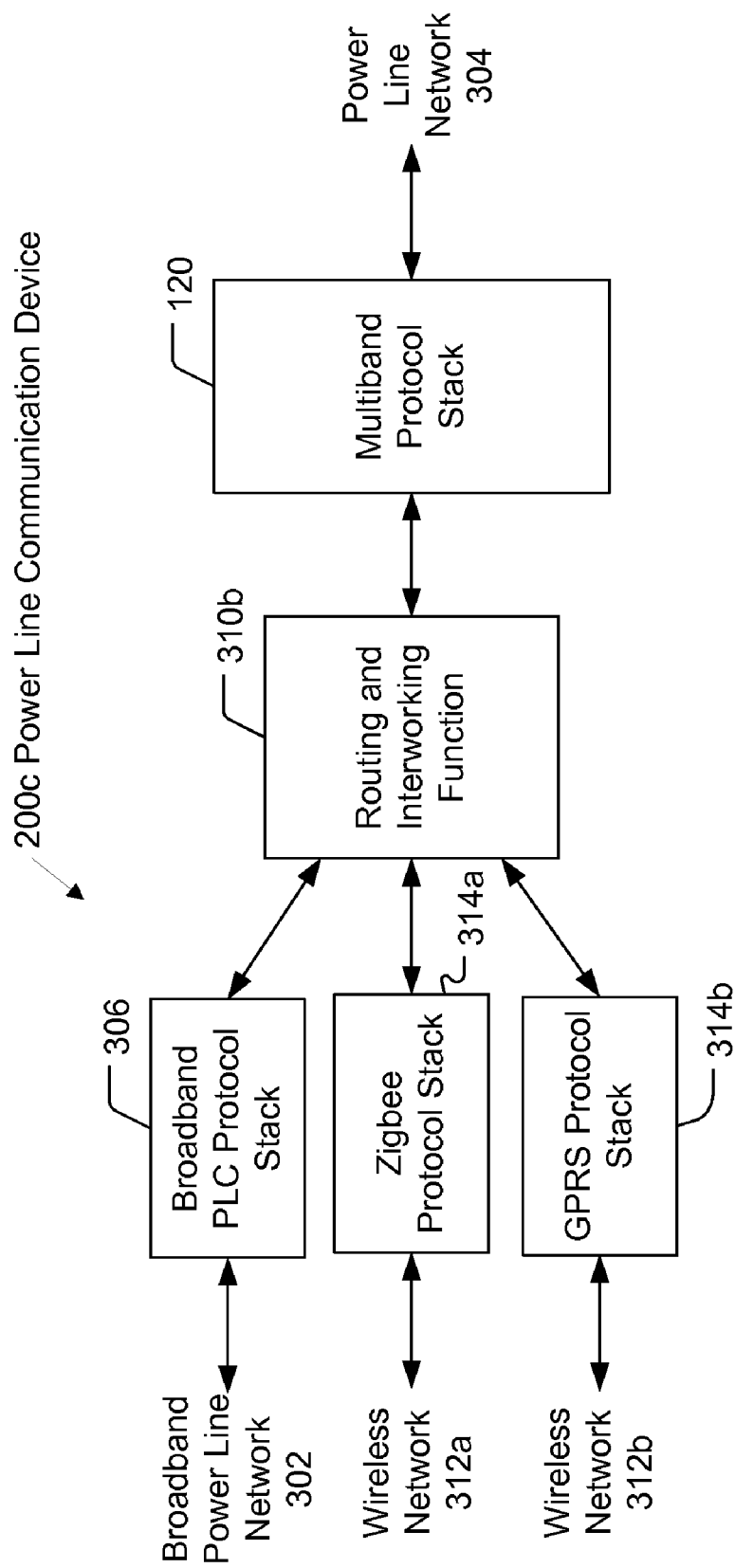
FIG. 7 is a functional block diagram of power line communication device having multiple interfaces, in accordance with an example embodiment of the present invention.

FIG. 7 is a schematic showing functional portions of yet another power line communication device 200*c* which communicates over various networks, such as a broadband PLC network 302, wireless networks 312*a,b* and a multiband PLC network 304. The PLCD 200*c* includes functional components similar to those of the PLCD 200 of FIG. 4, PLCD 200*a* of FIG. 5*a*, and PLCD 200*b* of FIG. 6. Note that in this schematic the protocol stacks are illustrated (instead of modems), which typically are integrated in a modem. Each interface may include a protocol stack for handling communications via its respective network. For example, a broadband PLC network interface may include a broadband (single band) PLC protocol stack 306. One or more wireless network interfaces may include a ZigBee protocol stack 314*a* and/or a GPRS/CDMA2000 protocol stack 314*b*, or another stack that supports a wireless protocol. A multiband PLC network interface may include the multiband protocol stack 120, according to an example embodiment of this invention. Each stack may be communicatively coupled to a controller 310*b* (that includes a processor and memory storing executable program code) that may provide routing and interworking functions. In one implementation, each protocol stack is embodied in a different integrated circuit (modem chip or chip set) and be formed of different modems. In another implementation, two or more of stacks may be formed by a single integrated circuit (modem chip or chip set) and be formed of a single modem.

In an example implementation, broadband power line communications may traverse medium voltage power lines and be received at PLCD 200*c*, where they are processed by the broadband PLC protocol stack 306. The routing and interworking function module 310 of the PLCD's 200*c* controller may re-transmit the data back onto the medium voltage power lines. Alternatively, the communication may be directed to one of the other networks. For example the communication may be directed to multiband PLC protocol stack 308 (e.g., communicating via narrowband communications) which transmits the communication toward a target device over a medium voltage or low voltage power line.

A communication from a wireless network 312*a,b* may be processed by the corresponding wireless network protocol stack 314*a,b*. The routing and interworking function of controller 310 of the PLCD 200*c* may then transmit the data to the multiband protocol stack 308 which transmits the communication over the power line network 304, such as via a medium voltage or low voltage power line (overhead or underground). In particular, communications received at the PLCD 200*c* destined for a destination device supported by the PLCD 200*c* (as determined by routing or bridging data stored in memory) may be directed to the multiband protocol stack 308. Such stack 308 may package and send the data over the multiband PLC network toward the destination device using the methodology implemented by the multiband protocol stack 308.

For communications originating from a device connected to the narrowband power line network 304, the protocol stack 308 (which may either be conventional protocol stack 100 or multiband protocol stack) may process the received data signal and provide the data to the controller for routing and interworking functions, which may then provide the data to the appropriate stack for communication onto the desired network 302, 304, 312.

In other embodiments the PLCD 200 may be implemented for communicating with different portions of a multiband PLC communication network 304 (such as an medium voltage power line portion and a low voltage power line portion). Such a PLCD 200*c* may include a pair of multiband PLC interfaces, each having a multiband PLC multiband protocol stack 308.

Figure 11:
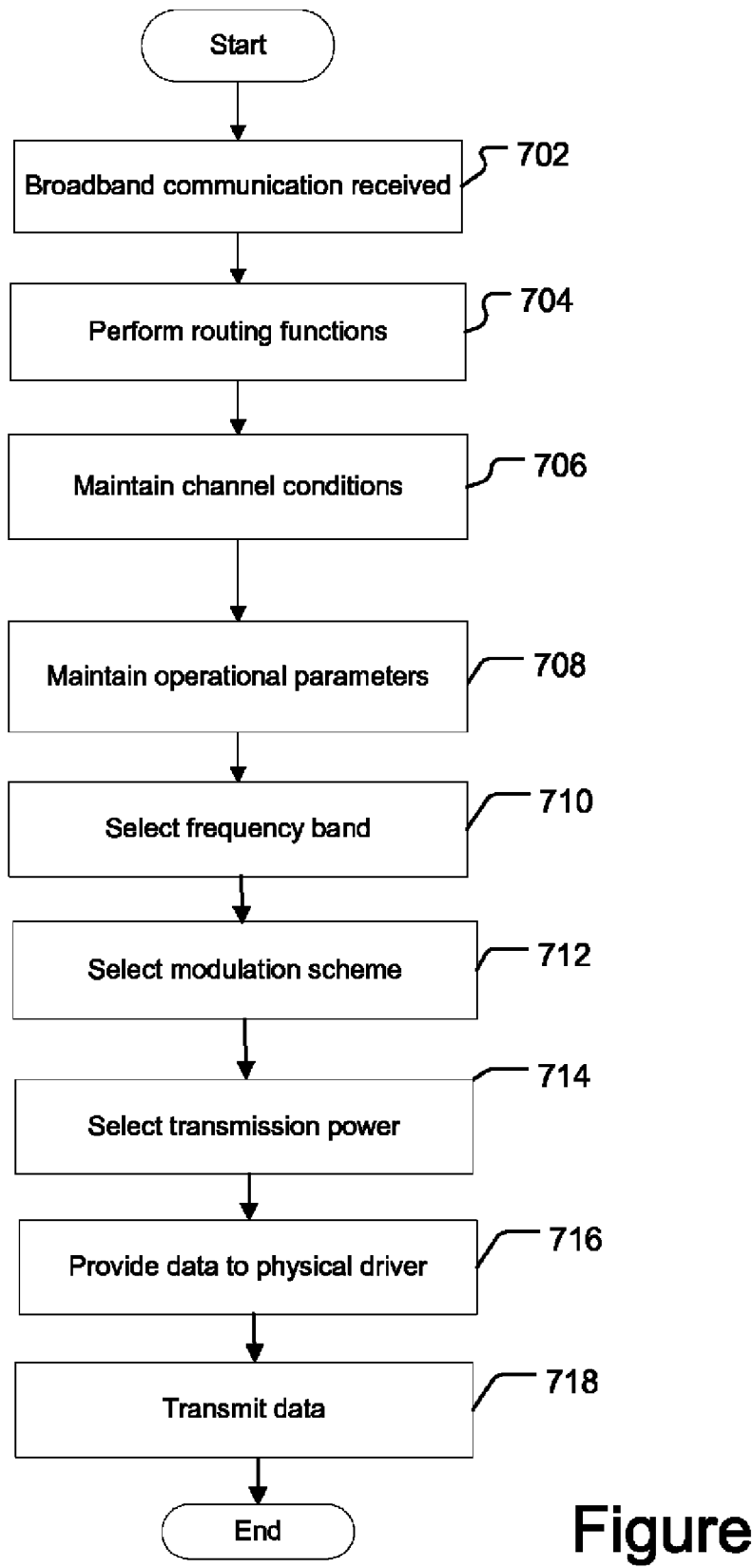
FIG. 11 is a flow chart of a method for communicating data using a multiband protocol stack according to an example embodiment of the present invention.

Various embodiments may perform all, many, or only a few of the processes described herein. In one example embodiment, the processes illustrated in FIG. 11 are performed. Please note, however, that these process steps may be performed in any suitable order and the invention is not limited to the sequence illustrated. In addition, some embodiments may omit some of these steps and/or include other steps. At step 702, the data is received via a broadband communication. At 704, the controller performs routing functions. At step 706, one or more channel conditions are maintained and may be used (e.g., with other factor) to select a frequency band, modulation scheme, and/or transmission power. At step 708, one or more operational parameters are maintained and may be used (e.g., with other factor) to select a frequency band, modulation scheme, and/or transmission power. At step 710, one of the plurality of frequency bands may be selected. At step 712, one of a plurality of modulation schemes may be selected. At step 714, the transmission power may be determined. At step 716, the data may be provided to the physical driver (e.g., corresponding to the selected frequency band). At step 718, the data is transmitted by the physical driver in the selected frequency band and in a data signal modulated in accordance with the selected modulation scheme.

Power Line Communication System

Figure 8:
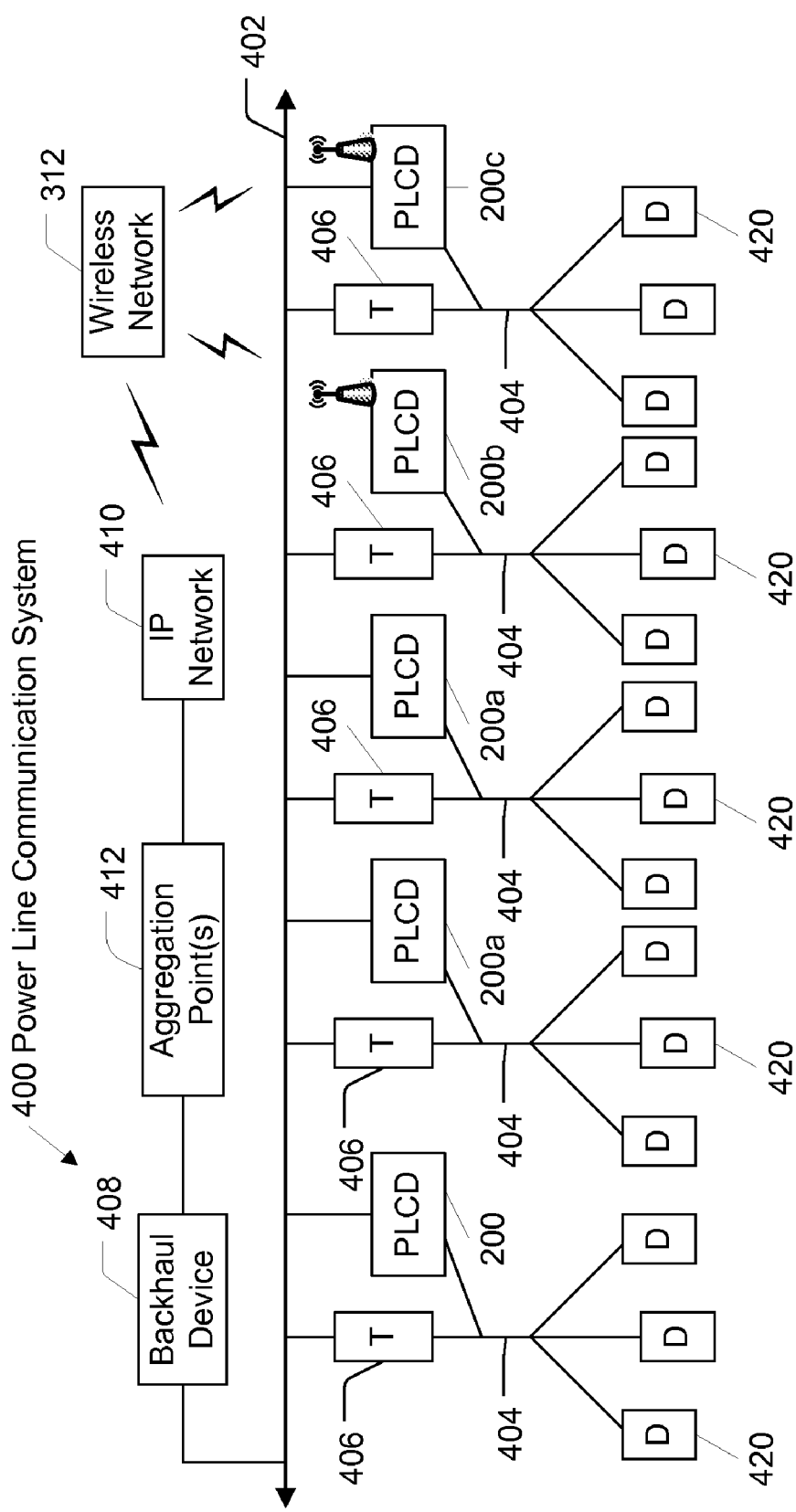
FIG. 8 is a block diagram of a power line communication system, according to an example embodiment of the present invention.

FIG. 8 shows an embodiment of a power line communication system (PLCS) 400, according to an example embodiment of the present invention. The PLCS 400 includes multiple power line communication devices 200a which send and receive communications using medium voltage power lines 402 and low voltage power lines 404. In some embodiments a PLCD 200a may form a bypass device which receives data from a medium voltage power line 402, and transmits the data along one or more low voltage power lines 404 thereby bypassing the power distribution transformer 406. Similarly, data received from a low voltage power line 404 may bypass the distribution transformer 406 and be transmitted along a medium voltage power line 402 by the PLCD 200. In some embodiments the PLCS 400 also may include a backhaul device 408 which communicates with a group of PLCDs 200a connected to a MV power line 402. Thus, the backhaul device 408 may provide a path for coupling the PLCS 400 to an IP network 410 (e.g., the Internet), such as through an aggregation point 412 and point of presence (POP).

The PLCS 400 may implement various communication services and use various communication protocols. For example, the PLCS 400 may provide internet access via the power lines 402, 404 to customer premises. In an embodiment of the present invention, multiband power line communications may be used by the PLCS to communicate with various devices 420, such as automated utility meters (e.g., power, gas, water, sewer meters), and consumer devices (e.g. faxes, computers, televisions, DVRs, VoIP telephones, etc.) and others. In yet another example, the PLCS 400 may be used only for utility communications such as meter reading (but not internet access). In another embodiment, the devices 420 may be configured to communicate utility data (e.g., power usage data, power factor data, voltage data (such as peak, RMS), current data) with one or more remote devices that may comprise automated utility meters. In one embodiment, each such device may be allocated a separate band. For example, a broadband communications protocol may be implemented for communications between a PLCD 200a and another PLCD 200, or with the backhaul device 408 over the MV power line. Multiband (narrowband) communications may be implemented by each PLCD 200a for communications with the devices 420 coupled to the low voltage power line of that PLCD 200a such as utility meters and consumer devices. Such multiband communications may be implemented using the multiband protocol stack 120 as previously described. Alternately, narrowband communications may be used as discussed with respect to FIG. 5b. Accordingly, a data communication may originate from a data center or other source coupled to the IP network 410, be received into the PLCS 400 at the backhaul device 408, then transmitted over the power lines to a PLCD 200a using a broadband communication protocol. The PLCD 200a may then repackage the data to be sent to a destination device 420 using the PLCD's multiband protocol stack 120 (or, alternately, via a conventional OFDM protocol stack 100 for narrowband communications). The destination device 420 which ultimately receives the communication may be identified by a destination address in the originally transmitted data packet. In another embodiment, the destination device 420 maybe identified by a translated destination address derived through protocol conversion by any of the intermediate interworking bridge device PLCD 200. Similarly, a remote device 420 may send a communication to the PLCD 200a which receives the communication using the multiband protocol stack 120 (or, alternately, via a conventional OFDM protocol stack 100 for narrowband communications). The PLCD 200a repackages the communication for a broadband protocol, and then transmits the communication toward a destination (e.g., the Backhaul Device 408). Such destination may be at an address within the PLCS 400 or within the IP network 410.

The PLCS 400 also may be coupled to a wireless network 312. For example, a PLCD 200b may include a wireless network interface and a multiband PLC interface. Wireless communications may be received at the PLCD 200b using a wireless protocol stack 314 (see FIG. 6), such as a ZigBee protocol stack 314a or GPRS protocol stack 314b (see FIG. 7). Such communications may be repackaged and sent to a destination device 420 using the multiband protocol stack 120 (see FIG. 6) (or, alternately, via a conventional OFDM protocol stack 100 for narrowband communications). Similarly, the device 420 may send a communication to the PLCD 200b which receives the communication using the multiband protocol stack 120, which repackages the communication for a wireless protocol, and then sends the communication through the wireless network 312.

As another example, a PLCD 200c may be coupled to both the wireless network 312 and to the power lines 402, 404. Communications may originate from the IP network 410, the wireless network 312, or a device 420 within the PLCS 400 and be transmitted to another device 420 within the PLCS 400 or the IP network 410. Communication paths between a given device 420 and its PLCD 200c may be implemented using the multiband protocol stack 120, while communications between the PLCD 200c and another PLCD 200 or the backhaul device 408 may be implemented using a broadband PLC protocol stack 306; and communications between the PLCD 200c and wireless network 312 may be implemented using a wireless protocol stack 314.

In some embodiments, the PLCS 400 may implement multiband communications over the entire power line network. In such embodiments, a PLCD 200 may be installed at each communication node. Each such PLCD 200 may include a pair of multiband protocol stacks 120 (each in a modem). Thus, communications between the backhaul device 408 and PLCDs 200, among the PLCDs 200, and to and from the devices 420 may be implemented using multiband communications.

Methods of Communicating Using Power lines

Figure 9:
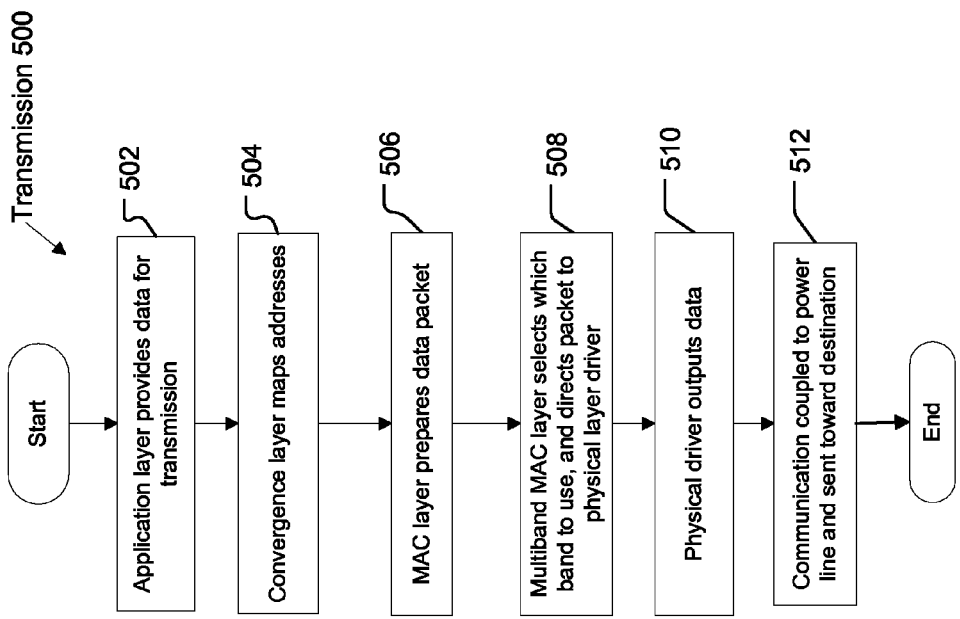
FIG. 9 is a flow chart of a method for transmitting communications using a multiband protocol stack according to an example embodiment of the present invention.

FIG. 9 depicts a process 500 for transmitting data over a power line using a PLC multiband protocol stack 120 according to an example process. At step 502, the application layer 108 (see FIG. 2) provides data to be transmitted. At step 504, the convergence layer 106 maps the data addresses (e.g., layer 3 addressing). At step 506, the MAC layer 104, prepares a data packet (e.g., layer 2 addressing). At step 508, the multiband MAC layer 122 selects the band of the multiple bands is to be used for the communication, sets power transmission, etc. and provides the data packet to the physical layer 124. At step 510, the physical layer driver 144 outputs the data. At step 512, the analog front end couples the communication onto the power line 402, 404 (via a coupler 210 if necessary). Accordingly, the communication is transmitted using a low voltage power line 404 or medium voltage power line 402. Error checking also may be performed.

Figure 10:
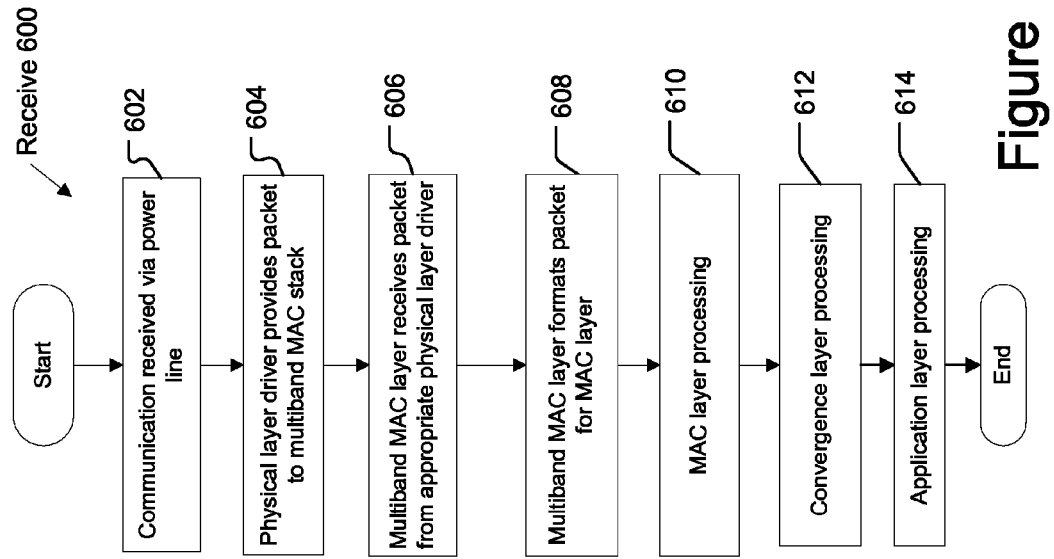
FIG. 10 is a flow chart of a method for receiving communications using a multiband protocol stack according to an example embodiment of the present invention.

FIG. 10 depicts a process 600 for receiving data via a power line using a PLC multiband protocol stack 120. At step 602, the communication is received via the analog front end and (in some embodiments) via the coupler 210 from a medium voltage power line 402 or low voltage power line 404. At step 604, the physical layer device driver 144 of the physical layer receives the data packet. At step 606 the multiband MAC layer 122 receives the data packet from the appropriate physical layer driver 144. At step 608, the multiband MAC layer formats the packet for the MAC layer 104. At steps, 610, 612, and 614 MAC layer processing, convergence layer processing, and application layer processing are performed to map the data and otherwise make the received data available to one or more application programs being executed by a processor included in or coupled to the PLCD 200.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for communicating over power lines comprising:
    a first device configured to communicate via broadband communications having a bandwidth greater than one megahertz;
    a second device having a first port and a second port;
    wherein said second port configured to communicate with said first device via broadband communications;
    wherein said first port is configured to communicate over one or more power lines with one or more remote devices via at least one of a plurality of selectable frequency bands; and
    wherein each of the plurality of frequency bands has a bandwidth that is less than five hundred kilohertz.

2. The system according to claim 1, wherein said first port is configured to dynamically vary a transmission power.

3. The system according to claim 1, wherein said first port is configured to differentially transmit data signals over a first and second energized power line conductor.

4. The system according to claim 1, wherein said first port is configured to communicate using a multitude of the plurality of frequency bands concurrently.

5. The system according to claim 1, wherein said first port comprises a plurality of physical drivers and wherein each physical driver is configured to transmit in a different one of the plurality of frequency bands.

6. The system according to claim 1, wherein said first port is configured to select one of a plurality of schemes of modulation for transmission of data.

7. The system according to claim 1, wherein said first port is configurable to maintain data of one or more channel conditions for a multitude of the plurality of frequency bands.

8. The system according to claim 7, wherein said first port is configurable to dynamically change a modulation scheme for communications based, at least in part, on a change in a channel condition of a frequency band.

9. The system according to claim 7, wherein said first port is configurable to change a frequency band of communications based, at least in part, on a change in a channel condition of a frequency band.

10. The system according to claim 1, wherein said first port is configured to store data of one or more operational parameters; and wherein at least one said operational parameters comprises a signal-to-noise ratio.

11. The system according to claim 1, wherein at least some the plurality of frequency bands have different bandwidths.

12. The system according to claim 1, wherein the one or more remote devices comprise utility meters.

13. The system according to claim 1, wherein said first port is configured to transmit data signals in a multitude of frequency bands while concurrently receiving data signals in a multitude of frequency bands.

14. The system according to claim 1, wherein said first device and said second port of said second device are configured to communicate with each other via broadband power line communications.

15. The system according to claim 1, wherein said first device and said second port of said second device are configured to communicate with each other via broadband wireless communications.

16. The system according to claim 1, wherein said second device includes a controller in communication with said first port and said second port and configured to perform routing functions for data received from said first device.

17. The system according to claim 1, wherein said second port of said second device is connected to an external low voltage power line and said second device is co-located with a distribution transformer.

18. A system for communicating over power lines comprising:
    a plurality of devices having a first port and a second port;
    wherein said second port is configured to communicate with an upstream device line via broadband communications occupying a bandwidth that is greater than one megahertz;
    wherein said first port is configured to communicate over one or more power lines with one or more remote devices via a plurality of frequency bands;
    wherein each of the plurality of frequency bands has a bandwidth that is less than five hundred kilohertz; and
    wherein each of the plurality of devices is configured to communicate utility data with the one or more remote devices.

19. The system according to claim 18, wherein said first port is configured to vary a transmission power.

20. The system according to claim 18, wherein said first port is configured to differentially transmit data signals over a first and second energized power line conductor.

21. The system according to claim 18, wherein said first port is configured to communicate using a multitude of the plurality of frequency bands concurrently.

22. The system according to claim 18, wherein said first port comprises a plurality of physical drivers and wherein each physical driver is configured to transmit in a different one of the plurality of frequency bands.

23. The system according to claim 18, wherein said first port is configured to dynamically select one of a plurality of schemes of modulation for transmission of data.

24. The system according to claim 18, wherein said first port is configurable to maintain data of one or more channel conditions for a multitude of the plurality of frequency bands.

25. The system according to claim 24, wherein said first port is configurable to dynamically change a modulation scheme for communications based, at least in part, on a change in a channel condition of a frequency band.

26. The system according to claim 24, wherein said first port is configurable to change a frequency band of communications based, at least in part, on a change in a channel condition of a frequency band.

27. The system according to claim 18, wherein said first port is configured to store data of one or more operational parameters; and wherein at least one of said operational parameters comprises a signal-to-noise ratio.

28. The system according to claim 18, wherein at least some the plurality of frequency bands have different bandwidths.

29. The system according to claim 18, wherein the one or more remote devices comprise utility meters.

30. The system according to claim 18, wherein the broadband communications comprise broadband power line communications.

31. The system according to claim 18, wherein the broadband communications comprise wireless broadband communications.

32. The system according to claim 18, wherein said plurality of devices are configured to receive utility data from the one or more remote devices and to transmit the utility data to a remote computer via the upstream device and the Internet.

33. A method of communicating over power lines, comprising:
receiving data via the broadband communications;
selecting a first frequency band from a plurality of frequency bands;
wherein each of the plurality of frequency bands has bandwidth that is less than five hundred kilohertz;
selecting a modulation scheme from a plurality of modulation schemes; and
transmitting the data over a power line using the selected modulation scheme in the selected frequency band.

34. The method according to claim 33, further comprising receiving utility data from the one or more remote devices and transmitting the utility data to a remote computer via the Internet.

35. The method according to claim 33, wherein transmitting comprises differentially transmitting the data over a first and second energized power line conductor.

36. The method according to claim 33, further comprising transmitting data signals in a multitude of frequency bands while concurrently receiving data signals in a multitude of frequency bands.

37. The method according to claim 33, further comprising storing data of one or more channel conditions for a multitude of the plurality of frequency bands.

38. The method according to claim 37, further comprising dynamically changing a modulation scheme for communications based, at least in part, on a change in a channel condition of a frequency band.

39. The method according to claim 37, further comprising changing a frequency band of communications based, at least in part, on a change in a channel condition of a frequency band.

40. The method according to claim 33, further comprising storing data of one or more operational parameters associated with one or more frequency bands; and wherein at least one said operational parameters comprises a signal-to-noise ratio.

41. The method according to claim 33, wherein the broadband communications comprise wireless broadband communications.

* * * * *